US007194804B2

(12) United States Patent
Czaplicki

(10) Patent No.: US 7,194,804 B2
(45) Date of Patent: *Mar. 27, 2007

(54) METHOD OF FORMING A HYDROFORM

(75) Inventor: Michael J. Czaplicki, Rochester, MI (US)

(73) Assignee: L & L Products, Inc., Romeo, MI (US)

( * ) Notice: Subject to any disclaimer, the term of this patent is extended or adjusted under 35 U.S.C. 154(b) by 387 days.

This patent is subject to a terminal disclaimer.

(21) Appl. No.: 10/696,314

(22) Filed: Oct. 29, 2003

(65) Prior Publication Data

US 2004/0084141 A1 May 6, 2004

Related U.S. Application Data

(63) Continuation of application No. 09/459,756, filed on Dec. 10, 1999, now Pat. No. 6,668,457.

(51) Int. Cl.
*B21D 53/88* (2006.01)

(52) U.S. Cl. .................................... 29/897.2; 29/421.1

(58) Field of Classification Search ............... 29/421.1, 29/897.2; 72/56, 63

See application file for complete search history.

(56) References Cited

U.S. PATENT DOCUMENTS 1,814,677 A 7/1931 Fennema
3,025,596 A * 3/1962 Ward et al. ................. 228/131
3,054,636 A 9/1962 Wessells III
3,123,170 A 3/1964 Bryant
3,400,182 A 9/1968 Kolt
3,493,257 A 2/1970 Fitzgerald et al.
3,615,974 A 10/1971 Graff
3,649,375 A 3/1972 Venkatesan
3,665,968 A 5/1972 DePutter
3,746,387 A 7/1973 Schwenk
3,757,559 A 9/1973 Welsh
3,868,796 A 3/1975 Bush
3,890,108 A 6/1975 Welsh
4,019,301 A * 4/1977 Fox ........................... 52/721.4
4,029,128 A 6/1977 Yamagishi
4,082,825 A 4/1978 Puterbaugh (Continued)

FOREIGN PATENT DOCUMENTS

DE 2919046 5/1979

(Continued)

OTHER PUBLICATIONS

International Search Report dated Oct. 19, 2001.

(Continued)

*Primary Examiner*—Marc Jimenez
(74) *Attorney, Agent, or Firm*—Dobrusin & Thennisch PC

(57) ABSTRACT

A reinforced hydroform member having an outer structural member reinforced by a structural foam supported by the outer structural member. The structural foam extends along at least a portion of the length of the outer structural member. The structural foam is a heat-activated epoxy-based resin. As the foam is heated, it expands and adheres to adjacent surfaces. The preferred structural foam material is commercially available from L&L Products of Romeo, Mich. under the designation L5206, L5207, L5208, or L5209.

24 Claims, 2 Drawing Sheets

U.S. PATENT DOCUMENTS 4,083,384 A 4/1978 Horne et al.
4,090,734 A 5/1978 Inami et al.
4,238,540 A 12/1980 Yates et al.
4,378,395 A 3/1983 Asoshina et al.
4,397,490 A 8/1983 Evans et al.
4,440,434 A 4/1984 Celli
4,457,555 A 7/1984 Draper
4,463,870 A 8/1984 Coburn, Jr. et al.
4,559,274 A 12/1985 Kloppe et al.
4,598,857 A * 7/1986 Matsui ...................... 228/132
4,610,836 A 9/1986 Wycech
4,613,177 A 9/1986 Loren et al.
4,695,343 A 9/1987 Wycech
4,705,716 A 11/1987 Tang
4,732,806 A 3/1988 Wycech
4,751,249 A 6/1988 Wycech
4,762,352 A 8/1988 Enomoto
4,769,391 A 9/1988 Wycech
4,803,108 A 2/1989 Leuchten et al.
4,810,548 A 3/1989 Ligon, Sr. et al.
4,813,690 A 3/1989 Coburn, Jr.
4,836,516 A 6/1989 Wycech
4,853,270 A 8/1989 Wycech
4,861,097 A 8/1989 Wycech
4,864,711 A * 9/1989 Yokota ...................... 29/458
4,898,630 A 2/1990 Kitoh et al.
4,901,395 A 2/1990 Semrau
4,901,500 A 2/1990 Wycech
4,908,930 A * 3/1990 Wycech .................... 29/527.2
4,917,435 A 4/1990 Bonnett et al.
4,922,596 A 5/1990 Wycech
4,923,902 A 5/1990 Wycech
4,946,737 A 8/1990 Lindeman et al.
4,978,562 A 12/1990 Wycech
4,984,406 A 1/1991 Friesen
4,989,913 A 2/1991 Moore, III
4,995,545 A 2/1991 Wycech
5,040,803 A 8/1991 Cieslik et al.
5,072,952 A 12/1991 Irrgeher et al.
5,102,188 A 4/1992 Yamane
5,122,398 A 6/1992 Seiler et al.
5,124,186 A 6/1992 Wycech
5,194,199 A 3/1993 Thum
5,209,541 A 5/1993 Janotik
5,213,391 A 5/1993 Takagi
5,255,487 A 10/1993 Wieting et al.
5,266,133 A 11/1993 Hanley et al.
5,338,080 A 8/1994 Janotik et al.
5,344,208 A 9/1994 Bien et al.
5,358,397 A 10/1994 Ligon et al.
5,373,027 A 12/1994 Hanley et al.
5,382,397 A 1/1995 Turner, Jr.
5,395,135 A 3/1995 Lim et al.
5,474,721 A 12/1995 Stevens
5,475,911 A 12/1995 Wells et al.
5,506,025 A 4/1996 Otto et al.
5,560,672 A 10/1996 Lim et al.
5,575,526 A * 11/1996 Wycech ..................... 296/205
5,577,784 A 11/1996 Nelson
5,580,120 A 12/1996 Nees et al.
5,642,914 A 7/1997 Takabatake
5,648,401 A 7/1997 Czaplicki et al.
5,649,400 A 7/1997 Miwa
5,652,039 A 7/1997 Tremain et al.
5,660,116 A 8/1997 Dannawi et al.
5,707,098 A 1/1998 Uchida et al.
5,720,092 A * 2/1998 Ni et al. ................... 29/421.1
5,725,272 A 3/1998 Jones
5,731,069 A 3/1998 Delle Donne et al.
5,755,486 A 5/1998 Wycech
5,766,719 A 6/1998 Rimkus
5,785,376 A 7/1998 Nees et al.
5,786,394 A 7/1998 Slaven
5,803,533 A 9/1998 Schulz et al.
5,804,608 A 9/1998 Nakazato et al.
5,806,915 A 9/1998 Takabatake
5,806,919 A 9/1998 Davies
5,819,408 A 10/1998 Catlin
5,839,777 A 11/1998 Vlahovic
5,851,626 A 12/1998 McCorry et al.
5,855,094 A 1/1999 Baudisch et al.
5,866,052 A 2/1999 Muramatsu
5,871,849 A 2/1999 Lepine
5,878,784 A 3/1999 Sales et al.
5,884,960 A * 3/1999 Wycech .................. 296/146.6
5,885,494 A 3/1999 Venkataraman et al.
5,885,688 A 3/1999 McLaughlin
5,888,600 A 3/1999 Wycech
5,888,642 A 3/1999 Meteer et al.
5,894,071 A 4/1999 Merz et al.
5,901,528 A 5/1999 Richardson
5,901,752 A 5/1999 Lundman
5,902,656 A 5/1999 Hwang
5,904,024 A 5/1999 Miwa
5,931,474 A 8/1999 Chang et al.
5,932,680 A 8/1999 Heider
5,934,737 A 8/1999 Abouzahr
5,941,597 A 8/1999 Horiuchi et al.
5,984,389 A 11/1999 Nuber
5,985,435 A 11/1999 Czaplicki et al.
5,988,734 A 11/1999 Longo et al.
5,992,923 A 11/1999 Wycech
5,994,422 A 11/1999 Born et al.
6,003,274 A 12/1999 Wycech
6,004,425 A 12/1999 Born et al.
6,006,484 A 12/1999 Geissbuhler
6,009,913 A * 1/2000 Kojima et al. .............. 138/146
6,016,603 A * 1/2000 Marando et al. ........... 29/897.2
6,022,066 A 2/2000 Tremblay et al.
6,033,300 A 3/2000 Schneider
6,050,630 A 4/2000 Hochet
6,053,210 A 4/2000 Chapman et al.
6,058,673 A 5/2000 Wycech
6,059,342 A 5/2000 Kawai et al.
6,068,424 A * 5/2000 Wycech ...................... 403/269
6,073,991 A 6/2000 Naert
6,077,884 A 6/2000 Hess et al.
6,079,180 A 6/2000 Wycech
6,082,811 A 7/2000 Yoshida
6,090,232 A 7/2000 Seeliger et al.
6,092,864 A 7/2000 Wycech et al.
6,094,798 A * 8/2000 Seeliger et al. ............... 29/469
6,096,403 A 8/2000 Wycech et al.
6,096,791 A 8/2000 Born et al.
6,099,948 A 8/2000 Paver, Jr.
6,102,379 A 8/2000 Ponslet et al.
6,102,473 A 8/2000 Steininger et al.
6,103,341 A 8/2000 Barz et al.
6,103,784 A 8/2000 Hilborn et al.
6,110,982 A 8/2000 Russick et al.
6,129,410 A 10/2000 Kosaraju et al.
6,131,897 A 10/2000 Barz et al.
6,135,542 A 10/2000 Emmelmann et al.
6,146,565 A 11/2000 Keller
6,148,581 A 11/2000 Separautzki
6,149,227 A 11/2000 Wycech
6,150,428 A 11/2000 Hanley, IV et al.
6,152,260 A 11/2000 Eipper et al.
6,153,709 A 11/2000 Xiao et al.
6,165,588 A 12/2000 Wycech
6,168,226 B1 1/2001 Wycech
6,174,932 B1 1/2001 Pachl et al.
6,183,013 B1 2/2001 Mackenzie et al.
6,189,953 B1 2/2001 Wycech 6,196,621 B1 3/2001 VanAssche et al.
6,197,403 B1 3/2001 Brown et al.
6,199,940 B1 3/2001 Hopton et al.
6,216,509 B1 4/2001 Lotspaih et al.
6,232,433 B1 5/2001 Narayan
6,233,826 B1 5/2001 Wycech
6,237,304 B1 5/2001 Wycech
6,247,287 B1 6/2001 Takabatake
6,253,524 B1 7/2001 Hopton et al.
6,254,488 B1 7/2001 Hill
6,263,635 B1 7/2001 Czaplicki
6,270,600 B1 8/2001 Wycech
6,272,809 B1 8/2001 Wycech
6,276,105 B1 8/2001 Wycech
6,276,740 B1 8/2001 Mellor et al.
6,277,898 B1 8/2001 Pachl et al.
6,281,260 B1 8/2001 Hanley, IV et al.
6,287,666 B1 9/2001 Wycech
6,296,298 B1 10/2001 Barz
6,303,672 B1 10/2001 Papalos et al.
6,305,136 B1 10/2001 Hopton et al.
6,308,412 B1 10/2001 Christofaro et al.
6,311,452 B1 11/2001 Barz et al.
6,315,938 B1 11/2001 Jandali
6,319,964 B1 11/2001 Blank et al.
6,321,793 B1 11/2001 Czaplicki et al.
6,332,731 B1 12/2001 Wycech
6,341,467 B1 1/2002 Wycech
6,348,513 B1 2/2002 Hilborn et al.
6,358,584 B1 3/2002 Czaplicki
6,368,438 B1 4/2002 Chang et al.
6,372,334 B1 4/2002 Wycech
D457,120 S 5/2002 Broccardo et al.
6,382,635 B1 5/2002 Fitzgerald
6,383,610 B1 5/2002 Barz et al.
6,389,775 B1 5/2002 Steiner et al.
6,406,078 B1 6/2002 Wycech
6,408,515 B1 6/2002 Durand
6,413,611 B1 7/2002 Roberts et al.
6,419,305 B1 7/2002 Larsen
6,422,575 B1 7/2002 Czaplicki et al.
6,435,601 B2 8/2002 Takahara
6,467,834 B1 10/2002 Barz et al.
6,471,285 B1 10/2002 Czaplicki et al.
6,474,722 B2 11/2002 Barz
6,474,723 B2 11/2002 Czaplicki et al.
6,482,486 B1 11/2002 Czaplicki et al.
6,486,256 B1 11/2002 Tabutton et al.
6,502,821 B2 1/2003 Schneider
6,561,571 B1 5/2003 Brennecke
6,619,727 B1 9/2003 Barz et al.
6,620,501 B1 9/2003 Kassa et al.
6,634,698 B2 10/2003 Kleino
6,641,208 B2 11/2003 Czaplicki et al.
6,668,457 B1 * 12/2003 Czaplicki .................. 29/897.1
6,682,818 B2 1/2004 Czaplicki et al.
6,692,347 B1 2/2004 Schneider
6,729,425 B2 5/2004 Schneider et al.
6,851,232 B1 2/2005 Schwegler
6,928,736 B2 * 8/2005 Czaplicki et al. .......... 29/897.2
2002/0053179 A1 5/2002 Wycech
2002/0054988 A1 5/2002 Wycech
2002/0066254 A1 6/2002 Ebbinghaus
2002/0074827 A1 6/2002 Fitzgerald et al.
2003/0001469 A1 1/2003 Hankins et al.
2003/0050352 A1 3/2003 Guenther et al.
2004/0074150 A1 4/2004 Wycech
2004/0084141 A1 5/2004 Czaplicki

FOREIGN PATENT DOCUMENTS

DE 3627725 A1 2/1988
DE 90 11 147.8 9/1990
DE 40 28 895 C1 2/1992
DE 42 27 393 A1 3/1993
DE 93 20 333.0 6/1994
DE 19632275 8/1996
DE 19635734 4/1997
DE 196 44 047 A1 5/1998
DE 196 48 164 A1 5/1998
DE 198 12 288 C 5/1999
DE 19753658 6/1999
DE 29904705 U1 6/1999
DE 198 56 255 C1 1/2000
DE 198 58 903 A1 6/2000
EP 0 061 131 8/1986
EP 0 236 291 9/1987
EP 0 414 302 A1 2/1991
EP 0 611 778 A3 1/1994
EP 0679501 11/1995
EP 0 697 956 B1 12/1996
EP 0 775 721 5/1997
EP 0707695 6/1998
EP 0863358 9/1998
EP 0 891 918 A1 1/1999
EP 0 893 331 A1 1/1999
EP 0 893 332 A1 1/1999
EP 0 893 332 B1 1/1999
EP 0 453 777 A2 10/1999
EP 1 122 156 A2 8/2001
EP 1 362 683 A2 11/2003
EP 1 362 769 A1 11/2003
EP 1 366 960 A1 12/2003
EP 1 484 162 12/2004
EP 1 508 508 2/2005
EP 1 555 191 7/2005
JP 61 118 211 6/1986
JP 01 069 309 3/1989
JP 01 164 867 6/1989
JP 02 206 537 8/1990
JP 5-38992 2/1993
JP 2001191947 7/2001
JP 02001191949 A 7/2001
WO WO87/01978 4/1987
WO WO89/06595 7/1989
WO WO 93/05103 9/1992
WO WO 95/02144 * 1/1995
WO WO 95/32110 5/1995
WO WO97/02967 1/1997
WO WO97/43501 11/1997
WO WO98/02689 1/1998
WO WO98/21060 5/1998
WO WO98/50221 5/1998
WO WO98/36944 8/1998
WO WO99/08865 2/1999
WO WO99/20516 4/1999
WO WO99/28575 6/1999
WO WO99/36243 7/1999
WO WO99/39882 8/1999
WO WO99/41468 8/1999
WO WO99/48746 9/1999
WO WO99/50057 10/1999
WO WO 99/61216 12/1999
WO WO 99/61236 12/1999
WO WO99/61237 12/1999
WO WO99/61281 12/1999
WO WO99/61289 12/1999
WO WO99/61719 12/1999
WO WO 99/64287 12/1999
WO WO00/03894 1/2000
WO WO00/12571 3/2000
WO WO00/13876 3/2000
WO WO00/13958 3/2000
WO WO 00/17000 3/2000
WO WO99/12595 3/2000
WO WO00/12595 4/2000

| | | |
|---|---|---|
| WO | WO00/20483 | 4/2000 |
| WO | WO00/22024 | 4/2000 |
| WO | WO00/27920 | 5/2000 |
| WO | WO00/37230 | 6/2000 |
| WO | WO00/37239 | 6/2000 |
| WO | WO00/37241 | 6/2000 |
| WO | WO00/37242 | 6/2000 |
| WO | WO00/37243 | 6/2000 |
| WO | WO00/37302 | 6/2000 |
| WO | WO 00/37302 | 6/2000 |
| WO | WO00/37554 | 6/2000 |
| WO | WO00/38863 | 7/2000 |
| WO | WO00/39232 | 7/2000 |
| WO | WO00/40629 | 7/2000 |
| WO | WO00/41051 | 7/2000 |
| WO | WO00/41916 | 7/2000 |
| WO | WO00/43253 | 7/2000 |
| WO | WO00/43254 | 7/2000 |
| WO | WO00/46017 | 8/2000 |
| WO | WO00/46461 | 8/2000 |
| WO | WO00/52086 | 9/2000 |
| WO | WO00/55444 | 9/2000 |
| WO | WO 00/68041 | 11/2000 |
| WO | WO01/54936 | 8/2001 |
| WO | WO01/56845 | 8/2001 |
| WO | WO01/57130 | 8/2001 |
| WO | WO01/71225 | 9/2001 |
| WO | WO01/83206 | 11/2001 |
| WO | WO 03/042024 A1 | 5/2003 |

OTHER PUBLICATIONS

Written Opinion dated Dec. 31, 2001.
International Preliminary Examination Report dated Apr. 19, 2002.
Born et al., Structural Bonding in Automotive Applications.
Hopton et al., Application of a Structural Reinforcing Material to Improve Vehicle NVH Characteristics.
Mansour et al., Optimal Bonding Thickness for Vehicle Stiffness.
Klein et al., Application of Structural Foam in the Body in White.

* cited by examiner

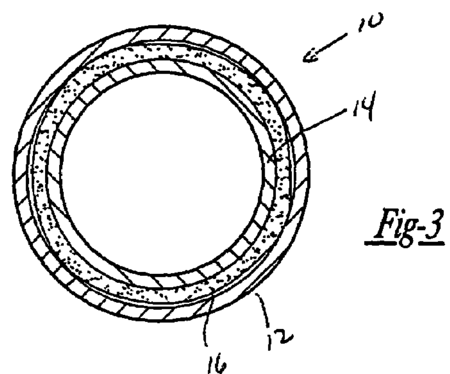
Fig-3
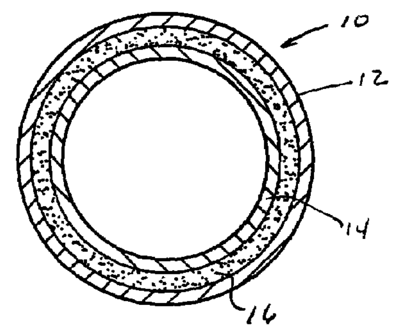
Fig-4
Fig-5
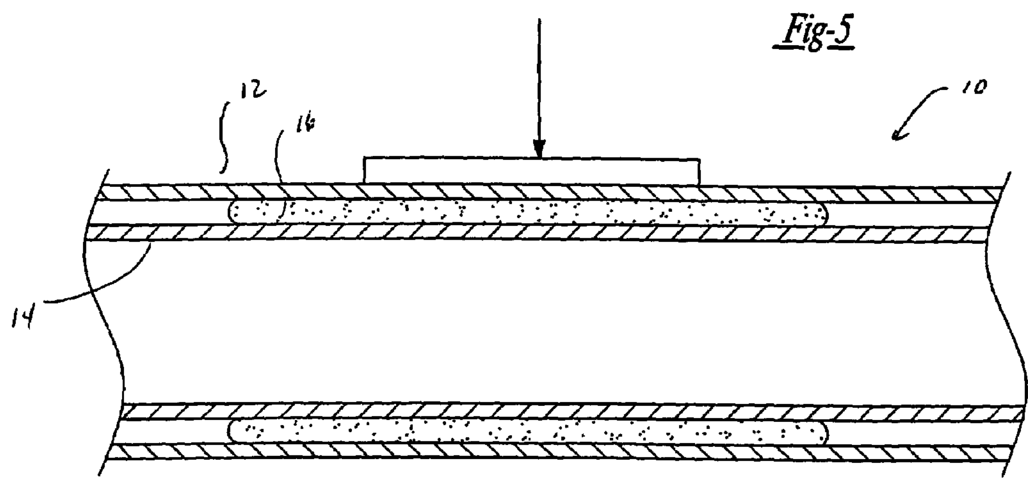

METHOD OF FORMING A HYDROFORM

This application is a continuation of and claim the benefit of the filing date of application Ser. No. 09/459,756 filed on Dec. 10, 1999, now U.S. Pat. No. 6,668,457.

FIELD OF THE INVENTION

The present invention relates generally to a heat-activated foam reinforced structural member. More particularly, the invention relates to a structural foam reinforced hydroform structures, wherein the structural foam becomes chemically active and expands upon heating.

BACKGROUND OF THE INVENTION

Traditionally, hydroforming techniques are used to draw and shape metal tubes. Conventional hydroforming techniques often involve two steps: (1) placing the desired bends in the tube and (2) forming the tube to the desired configuration. Step 2 usually requires placing a tubular member having an open bore in a mold and pinching off the ends of the tube. A pressurized liquid is injected into the open bore, causing the tube to stretch and expand out against the mold.

The advantage of the hydroforming process is that it allows formation of relatively long tubular structures having a seamless perimeter. This process eliminates the cost of welding or machining operations often used to shape the part in the desired configuration. As a result, a hydroform oftentimes has a high length to diameter ratio. For instance, a hydroform structure may have a length in excess of 15' and a diameter ranging from approximately ¾ to more than 12". It is not unusual for a hydroform structure to exceed the length of other tubular members, such as torsion bars or tubular bars, formed using other processes.

Additionally, hydroforms are complex structural shapes that typically include bends and contour changes. Often the number of bends and contour changes in a hydroformed bar are greater and more complex than those found in torsion bars or other tubular structures formed using different techniques.

Hydroform structures typically have a constant wall thickness prior to forming, and thus tend to develop weak spots at the site of bends or changes in contour, as well as at certain locations along a long tubular section. Thus, hydroform sections are generally reinforced to improve their structural stiffness and strength.

Traditional ways of reinforcing tubular structures such as hydroforms include sliding a metal sleeve inside the tube and welding the reinforcing member in place. However, because the hydroform often includes one or more bends or one or more changes in contour, it is often difficult to insert the sleeve into the hydroform at the site of weak spots. Other techniques include reinforcing the hydroform from the outside by welding the sleeve onto the outside of the hydroform. However, hydroforms are often used in applications having very close tolerances, resulting in little or no clearance for an externally placed reinforcing member.

Additionally, in many operations the weight of the tubular member is critical and must be kept low as possible. Thus, the use of an external sleeve adds unwanted weight to the tubular assembly. Finally, the welding operation tends to be labor intensive, time consuming and inexact, increasing the cost of forming the hydroform member and producing parts that have questionable reliability.

Consequently, there is needed a device and method for reinforcing the weak areas of hydroform tubes without significantly increasing the weight and manufacturing complexity.

SUMMARY OF THE INVENTION

The invention relates to a reinforced hydroform member. In one embodiment, the hydroform member includes an outer structural member having an open bore; and a structural foam supported by the outer structural member. The foam extends along at least a portion of the length of the outer structural member, and may fill at least a portion of the length of the bore.

The structural foam is generally and preferably a heat-activated epoxy-based resin. As the foam is heated, it expands and adheres to adjacent surfaces. The preferred structural foam material is commercially available from L&L Products of Romeo, Mich. under the designation L5206, L5207, L5208, or L5209.

In an alternative embodiment, the hydroform member includes an inner structural member having an open section, wherein the inner structural member is received in the bore of the outer structural member. The outer structural member and the inner structural member are fabricated of metal, and the structural foam extends along at least a portion of the length of the inner structural member and the outer structural member.

In still another embodiment, the reinforced hydroform includes an outer elongated tubular bar having a open center; an elongated inner tubular bar having an open bore coextensive therewith such that the inner tubular bar is received in the open center of the outer tubular bar so as to extend concentrically therewith; and a structural foam supported by the outer surface of the inner tubular bar, wherein the structural foam extends along at least a portion of the length of the inner structural member.

The reinforced hydroform may be formed by (1) providing an outer structural member having an open bore; (2) reinforcing the outer structural member by applying a structural foam thereto; (3) reshaping the outer structural member, causing the exterior surface of the outer structural member to assume a desired configuration; and (4) heating the structural foam to a temperature sufficient to cause the structural foam to expand and adhere to adjacent surfaces.

Where the hydroform includes a inner structural member, the method of forming the reinforced hydroform further includes the step of providing an inner structural member that is received in the open bore of the outer structural member so as to form a structural assembly. The structural assembly is reinforced by applying the structural foam thereto.

BRIEF DESCRIPTION OF THE DRAWINGS

The features and inventive aspects of the present invention will become more apparent upon reading the following detailed description, claims and drawings, of which the following is a brief description:

FIG. 3 is a section view of the hydroform tube described in FIG. 2, showing the position of the foam in the uncured state.

FIG. 4 is a section view of the hydroform tube described in FIG. 2, showing the position of the foam in the cured state.

FIG. 5 is a side section view showing the hydroform tube described in FIG. 2.

DESCRIPTION OF THE PREFERRED EMBODIMENT

Figure 1:
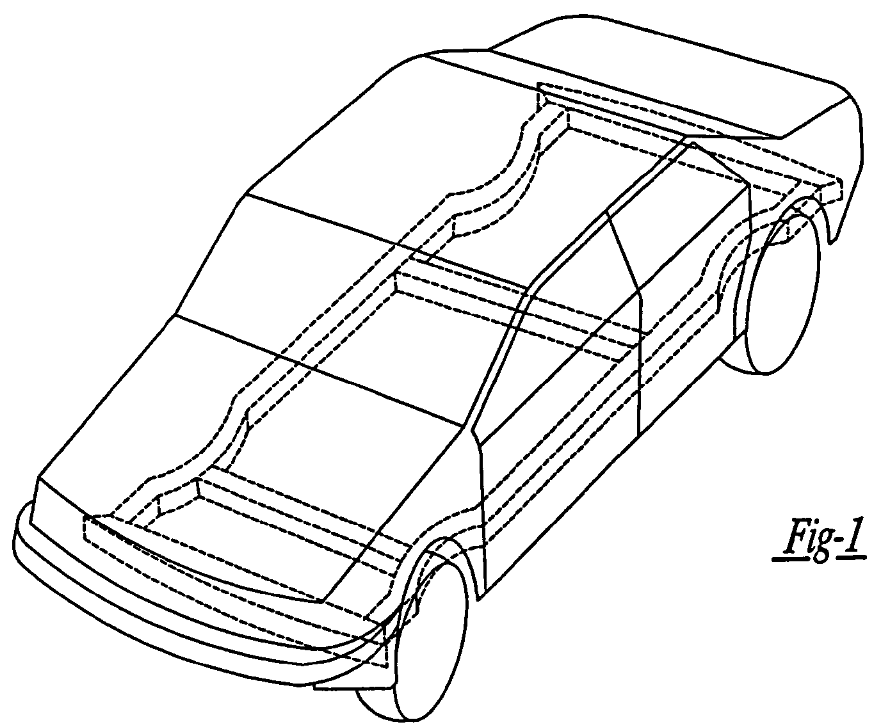
FIG. 1 is a perspective view of an automobile, showing a portion of the automobile frame reinforced by the hydroform member.

FIG. 1 shows a reinforced hydroform member 10 formed in accordance with the teachings of the present invention. The hydroform member 10 imparts increased strength or stiffness to a structural member, and, thus, may be used in a variety of applications. For instance, the reinforced hydroform member 10 may be used as part of the frame system for automobiles or building structures.

Figure 2:
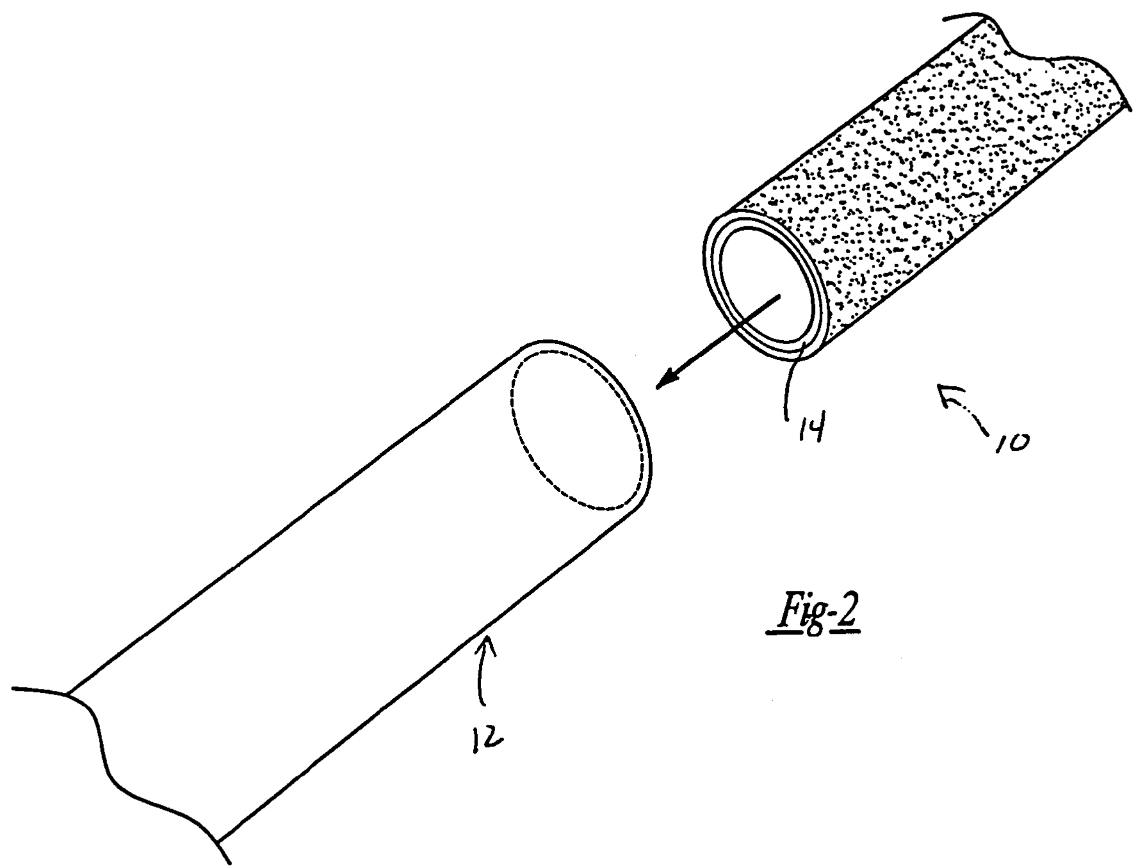
FIG. 2 is a perspective view showing a reinforced hydroform tube formed in accordance with the teachings of the present invention.

The hydroform member 10 includes an outer metal tube 12 and an inner concentric tube 14. The outer tube 12 includes an open center and preferably has a seamless outer perimeter. Although FIG. 2 shows the tube 12 as having a circular cross-section and an open center, other geometric configurations having a continuous perimeter and an open portion therein may be used to form the tube 12. In the preferred embodiment, the outer tube 12 is fabricated of steel. However, it will be appreciated that other materials capable of plastic deformation may be used.

The physical dimensions of the outer tube 12 will vary depending on the intended use of the hydroform member 10. Where the hydroform member 10 is used as part of an automobile framing system, the outer tube 12 may have a length in excess of 15' and an inner diameter typically ranging from approximately ¾" to 12". For an outer tube 12 having these dimensions, the outer tube 12 has a constant wall thickness prior to any deformation. The wall thickness of tube chosen will vary depending on the function and structure of the element being reinforced.

The inner tube 14 is received in the open center of the outer tube 12. Preferably, the inner tube 14 is concentrically received in the open center of the outer tube 12, and extends axially along the length of the outer tube 12 such that each end of the inner tube 14 is substantially flush with the respective ends of the outer tube 12.

In the preferred embodiment, the inner tube 14 has an open center and a seamless outer perimeter. Although FIG. 2 shows the tube 14 as having a circular cross-section and an open center, other geometric configurations having a continuous perimeter and an open portion therein may be used to form the tube 14. The preferred material from which to fabricate the inner tube 14 is steel. However, other materials capable of plastic deformation, particularly aluminum, may be used.

The physical dimensions of the inner tube 14 will vary depending on the intended use of the hydroform member 10. Where the hydroform member 10 is used as part of an automobile framing system, the inner tube 14 may have a length in excess of 15'. The inner diameter typically has a value ranging between approximately 1" and 12" and a constant wall thickness generally having a specific value ranging between 0.030" and 0.30".

As best seen in FIG. 2, the inner tube 14 supports a reinforcing structural foam 16 along at least a portion of the outer perimeter thereof. The primary purpose of the structural foam 16 is to increase the structural strength and stiffness of the components being reinforced. Typically, the structural foam 16 is applied to a carrier in the areas where reinforcement is needed. When dealing with hydroforms, the areas generally needing reinforcement are locations where the surface bends or changes contour. In the preferred embodiment, the structural foam 16 increases the compressive strength, bending strength, and structural stiffness of the hydroform 10 without adding significantly to the overall weight of the hydroform 10.

The structural foam 16 is preferably heat-activated and expands and cures upon heating, typically by a foaming and cross-linking reactions. The structural foam 16 is generally applied to the tube 14 in a solid or semi-solid state. The structural foam 16 may be applied to the outer perimeter of the tube 14 in a fluid state using commonly known injection techniques, wherein the structural foam 16 is heated to a temperature that permits the structural foam 16 to flow slightly. Upon cooling the structural foam 16 hardens and adheres to the outer surface of the tube 14. Alternatively, the structural foam 16 may be applied to the tube 14 as precast pellets, which are heated slightly to permit the pellets to bond to the outer surface of the tube 14. At this stage, the structural foam 16 is heated just enough to cause the structural foam 16 to flow slightly, but not enough to cause the structural foam 16 to thermally expand. Additionally, the structural foam may also be applied by heat bonding/thermoforming and by co-extrusion. Note that other expandable sheet materials can be used, such as, without limitation, an encapsulated mixture of materials that, when activated by temperature, pressure, chemically, or other by other ambient conditions, will expand.

The structural foam 16 is an epoxy-based material, but may include an ethylene copolymer or terpolymer, such as with an alpha-olefin. As a copolymer or terpolymer, the molecule is composed of two or three different monomers, i.e., small molecules with high chemical reactivity that are capable of linking up with similar molecules.

A number of epoxy-based structural reinforcing foams are known in the art and may also be used to produce the structural foam 16. A typical structural foam includes a polymeric base material, such as an epoxy resin or ethylene-based polymer which, when compounded with appropriate ingredients (typically a blowing agent and perhaps a curing agent and filler), expands and cures in a reliable and predictable manner upon the application of heat or another activation stimulus. The resulting material has a low density and sufficient stiffness to impart desired rigidity to a supported article. From a chemical standpoint for a thermally-activated material, the structural foam 16 is usually initially processed as a thermoplastic material before curing. After curing, the structural foam 16 typically becomes a thermoset material.

An example of a preferred structural foam 16 formulation is an epoxy-based material that may include an ethylene copolymer or terpolymer that is commercially available from L&L Products of Romeo, Mich., under the designations L5206,L5207, L5208 and L5209. One advantage of the preferred structural foam materials 16 over prior art materials is the preferred materials can be processed in several ways. The preferred materials can be processed by injection molding, extrusion or with a mini-applicator extruder. This enables the creation of part designs that exceed the capability of most prior art materials.

While the preferred materials for fabricating the structural foam 16 have been disclosed, the structural foam 16 can be formed of other materials provided that the material selected is heat-activated or otherwise activated by an ambient condition (e.g. moisture, pressure, time or the like) and expands in a predictable and reliable manner under appropriate conditions for the selected application. One such material is the epoxy based resin disclosed in U.S. patent application Ser. No. 09/268,810, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also U.S. Pat. Nos. 5,766,719; 5,755,486; 5,575,526; 5,932,680 (incorporated herein by reference). In general, the desired characteristics of the structural foam 16 include high stiffness, high strength, high glass transition temperature (typically greater than 70 degrees Celsius), and good corrosion and humidity resistance properties.

In applications where a heat activated, thermally expanding material is employed, an important consideration involved with the selection and formulation of the material comprising the structural foam 16 is the temperature at which a material reaction or expansion, and possibly curing, will take place. For instance, in most applications, it is undesirable for the material to be active at room temperature or otherwise at the ambient temperature in a production line environment. More typically, the structural foam 16 becomes reactive at higher processing temperatures, such as those encountered in an automobile assembly plant, when the foam 16 is processed along with the automobile components at elevated temperatures or at higher applied energy levels. While temperatures encountered in an automobile assembly body shop may be in the range of 148.89° C. to 204.44° C. (300° F. to 400° F.), body and paint shop applications are commonly about 93.33° C. (215° F.) or slightly higher. If needed, blowing agents can be incorporated into the composition to cause expansion at different temperatures outside the above ranges.

Generally, prior art expandable foams have a range of expansion ranging from approximately 0 to over 1000 percent. The level of expansion of the structural foam 16 may be increased to as high as 1500 percent or more, but is typically between 0% and 300%.

The hydroform member 10 may be used in a variety of applications where structural reinforcement is desired. The hydroform member 10 has particular application in those instances where the overall weight of the structure being reinforced is a critical factor. For instance, the hydroform member may be used to increase the structural strength of aircraft frames, marine vehicles, automobile frames, building structures or other similar objects. In the embodiment disclosed the hydroform member 10 is used as part of an automobile frame to reinforce selected areas of the automobile frame.

As best illustrated in FIG. 1, the hydroform member 10 is coupled to the frame portion of an automobile frame assembly. The frame portion to be reinforced by the hydroform member 10 is illustrated by the phantom lines. It will be appreciated that the hydroform 10 may be used to reinforce other areas of an automobile frame.

Method of Forming the Hydroform 10

The method of forming the hydroform member 10 includes applying the structural foam 16 to the outer perimeter of the inner tube 14. The structural foam 16 is applied to the inner tube 14 using the techniques previously discussed.

The inner tube 14 is then received in the open center of the outer tube 12. The tube assembly 12, 14 is reshaped to include any desired bends, twists or contour changes. One particular method in which the tube assembly 12, 14 could be deformed is by first inserting the inner tube 14 into the outer tube 12 to be hydroformed and then bending the outer tube 12 to lock the inner tube 14 into place. After completion of the bending process, the tube assembly 12, 14 is placed in a mold and each end of the tube assembly 12, 14 is sealed using known techniques. For instance, an end cap (not shown) is inserted over each end of the tubular members 12, 14, and one end of a kick bolt (not shown) is coupled to one of the end caps and the other end to a fluid source under pressure.

Next, a hydroforming process is employed to reshape and to stretch the tubular assembly 12, 14 to the desired configuration. It will be appreciated that hydroforming, sometimes referred to as fluid forming or rubber diaphragm forming, is a known process for drawing and shaping metal components. The hydroforming process explained herein is for illustrative purposes only, and it will be appreciated that other hydroforming techniques may be used.

The hydroforming process employed in practicing this invention includes injecting a liquid under pressure into the open center of the tube 14 through the end cap. The fluid pressure causes the tube assembly 12, 14 to expand outwardly, bringing the exterior of the tube 12 into contact with the mold into which the tube assembly 12, 14 has been placed. Consequently, the exterior of the outer tube 12 is forced to assume the shape of the mold. The inner tube 14 can also be drawn during the hydroforming operation at locations wherein the outer tube 12 is also drawn. In other words, the inner tube 14 can be deformed in the same manner as the outer tube 12, whether through the initial bending process or through the subsequent drawing process that occurs during hydroforming. Once the hydroforming process is completed, the kick bolt (not shown) is removed.

Finally, after hydroforming the tube assembly 12, 14, the strength and stiffness of the hydroform 10 is increased by curing the structural foam 16. To cure the structural foam 16, the structural foam 16 is heated to a temperature sufficient to permit the structural foam 16 to expand and adhere to the inner surface of the outer tube 12. As the structural foam 16 is heated, it becomes chemically active and expands, forming a bond with the adjacent structure, the inner surface of the tube 12. The characteristics of the foam 16 can be provided by a separate adhesive layer in between the structural foam 16 and the inner surface of the tube 16, or it can be obtained from the formulation of the foam 16 itself.

During the curing cycle, the structural foam 16 is heated to a temperature higher than the temperature used during application of the foam material 16 to the tube 14. This higher temperature causes activation of the expansion and curing properties of the structural foam 16 by initiating chemical decomposition of the blowing agent and curing agent additives. FIG. 4 illustrates the position of the structural foam 16 after the curing cycle. As shown, the structural foam 16 adheres to the inner surface of tube 12 and the outer surface of tube 14. After the curing process, the end caps (not shown) are removed.

Upon cooling, the structural foam 16 stiffens and resists deformation during handling. Preferably, for cost and weight considerations, the structural foam 16 does not extend throughout the entire length of the tube assembly 12, 14.

However, it will be appreciated that the structural foam 16 could be applied to the inner tube 14 so as to expand the entire length of the tubular assembly 12, 14.

Alternatively, the structural foam 16 may be applied to the tubular assembly 12, 14 using an extruder or injection process, wherein molten structural foam 16 is dispensed into key sections of the member to be reinforced. In this manner, the molten structural foam material 16 flows into the cavity to be reinforced. Another method for applying the structural foam 16 to the tubular assembly 12, 14 includes using structural foam 16 pellets. The pellets are inserted into the cavity between the tubes 12, 14 and cured as described above.

Preferably, the structural foam 16 is applied to the assembly 12, 14 at the location to be reinforced, which is generally at bends or locations where the surface contour changes. However, it will be appreciated that the structural foam 16 may be applied to the entire length of the hydroform 10 if desired.

The application of the structural foam 16 to the tube 14, increases the structural strength and stiffness of the tube 14. As a result, the overall structural strength and stiffness of the hydroform 10 is increased.

There are a variety of configurations that may be employed to fabricate a hydroform member 10. For instance, the hydroform 10 need not be fabricated as a tubular assembly but may comprise any configuration having a continuous perimeter and an open section therein. The disclosed embodiment is given to illustrate the invention. However, it is not intended to limit the scope and spirit of the invention. Therefore, the invention should be limited only by the appended claims.

I claim:

1. A method for forming a hydroform, comprising:

providing a first tubular structure having an outer surface;

disposing an adhesive structural material upon the outer surface with an applicator wherein the adhesive structural material includes epoxy;

providing a second tubular structure having an inner surface defining a bore;

hydroforming the first tubular structure while the adhesive structural material is located upon the outer surface thereby forming a hydroformed contour of the first tubular structure with the adhesive structural material located upon the contour; and adhering the adhesive structural material to the inner surface of the second tubular structure.

2. A method as in claim 1 wherein the step of hydroforming occurs while at least a portion the first tubular structure and the adhesive structural material are located within the open bore of the second tubular structure.

3. A method as in claim 1 wherein the adhesive structural material is epoxy-based.

4. A method as in claim 1 wherein the second tubular structure is metal.

5. A method as in claim 4 wherein the second tubular structure is formed of aluminum or steel.

6. A method as in claim 1 further comprising:

assembling the first tubular structure to a vehicle as a portion of a frame of the vehicle.

7. A method as in claim 1 wherein the adhesive structural material is activated for curing at a temperature in the range of about 148.89° C. to about 204.44° C.

8. A method as in claim 1 wherein the adhering step is performed prior to the step of hydroforming.

9. A method as in claim 1 wherein the hydroforming includes injecting a liquid under pressure into the bore such that an outer surface of the first structure assumes a shape of a mold.

10. A method for forming a hydroform, comprising:

providing a first structure having an inner surface defining an open bore;

providing a second structure having an outer surface;

positioning an adhesive structural material within the open bore of the first structure between the inner surface defining the bore and the outer surface of the second structure;

hydroforming the first structure and second structure while at least a portion of the structural material is located in the open bore wherein the hydroforming includes injecting a liquid under pressure into the bore such that an outer surface of the first structure assumes a shape of a mold; and adhering the adhesive structural material to the inner surface defining the bore and to the outer surface of the second structure.

11. A method as in claim 10 wherein the first structure is tubular.

12. A method as in claim 10 wherein the second structure is tubular.

13. A method as in claim 10 wherein the step of positioning the adhesive structural material within the open bore of the first structure includes disposing the adhesive structural material upon the outer surface of the second structure.

14. A method as in claim 10 wherein the adhesive structural material is expandable at a temperature greater than a glass transition temperature of the adhesive structural material.

15. A method as in claim 10 wherein the adhesive structural is epoxy-based.

16. A method as in claim 10 wherein the second structure is metal.

17. A method as in claim 16 wherein the second structure is formed of aluminum or steel.

18. A method as in claim 10 further comprising:

assembling the first structure to a vehicle as a portion of a frame of the vehicle.

19. A method as in claim 10 wherein the adhesive structural material is activated for curing at a temperature in the range of about 148.89°0 C. to about 204.44° C.

20. A method as in claim 10 wherein the adhering step is performed prior to the step of hydroforming.

21. A method for forming a reinforced hydroform automotive vehicle frame structure, comprising:

providing an outer elongated metal tubular structure having an inner surface defining an open bore;

providing an inner elongated metal tubular structure having an outer surface;

applying an adhesive structural material to at least one of the inner surface defining the open bore and the outer surface of the inner tubular structure;

introducing the adhesive structural material within a space defined between the inner surface of the outer tubular structure and the outer surface of the inner tubular structure; and hydroforming the outer tubular structure and the inner tubular structure with the adhesive structural material therebetween to form the automotive vehicle frame structure and for forming a first hydroformed contour in the inner tube and a second hydroformed contour in the outer tube wherein the first hydroformed contour is adjacent to and corresponding with the second hydroform contour and at least a portion of the expandable material is located between the first hydroformed contour and the second hydroformed; and bonding the adhesive structural material to at least one of the tubular structures wherein the bonding is performed prior to the step of hydroforming;

wherein the hydroforming includes injecting a liquid under pressure into the bore such that an outer surface of the outer structure assumes a shape of a mold; and wherein the adhesive structural material is epoxy based.

22. A method as in claim 21 wherein the adhesive structural material is expandable at a temperature greater than a glass transition temperature of the adhesive structural material.

23. A method as in claim 21 wherein the outer tubular structure is formed of aluminum or steel.

24. A method as in claim 21 further comprising:

assembling the outer tubular structure to a vehicle as a portion of a frame of the vehicle.

* * * * *